US007335242B2

(12) United States Patent
Oh

(10) Patent No.: US 7,335,242 B2
(45) Date of Patent: Feb. 26, 2008

(54) MULTI CYCLONE DUST-COLLECTING APPARATUS

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 531 days.

(21) Appl. No.: 11/075,602

(22) Filed: Mar. 9, 2005

(65) Prior Publication Data

US 2006/0107629 A1 May 25, 2006

(30) Foreign Application Priority Data

Nov. 25, 2004 (KR) ...................... 10-2004-0097265

(51) Int. Cl.
*B01D 45/12* (2006.01)

(52) U.S. Cl. ............................ 55/343; 55/349; 55/429; 55/459.1

(58) Field of Classification Search .................. 55/343, 55/346, 349, 429, 459.1, DIG. 3
See application file for complete search history.

(56) References Cited

U.S. PATENT DOCUMENTS

| | | | | |
|---|---|---|---|---|
| 2,143,144 | A | 1/1939 | Fagerberg | |
| D484,286 | S | 12/2003 | Dyson et al. | |
| 7,128,770 | B2 * | 10/2006 | Oh et al. | 55/343 |
| 2006/0123590 | A1 * | 6/2006 | Fester et al. | 15/353 |

FOREIGN PATENT DOCUMENTS

| | | |
|---|---|---|
| DE | 102004 034015 | 9/2005 |
| FR | 2619498 | 8/1987 |
| FR | 2619498 | 2/1989 |
| GB | 2406066 | 3/2005 |
| GB | 2406067 | 3/2005 |
| GB | 2410912 | 8/2005 |
| JP | 5214775 | 2/1977 |
| WO | WO 00/74548 | 12/2000 |
| WO | WO 02/067742 | 9/2002 |
| WO | WO02/067756 | 9/2002 |
| WO | WO 02/067757 | 9/2002 |

* cited by examiner

*Primary Examiner*—Robert A. Hopkins
(74) *Attorney, Agent, or Firm*—Ladas & Parry LLP

(57) ABSTRACT

A multi cyclone dust collecting apparatus comprises a multi cyclone unit having a first cyclone and a plurality of secondary cyclones. The first cyclone separates relatively large particles whereas the secondary cyclones separate out smaller particles. The cyclones are under a top cover mounted on a top portion of the multi cyclone unit and having a plurality of connecting covers forming a connecting path for guiding air flowing out of the first cyclone to the secondary cyclone, and a discharge cover forming a discharge path for guiding air flowing out of the secondary cyclone to the outside. The connecting covers and the discharge cover are integrally formed. A contaminant collecting unit is mounted to a bottom portion of the multi cyclone unit and collects contaminants separated from the first cyclone and the secondary cyclones.

8 Claims, 5 Drawing Sheets

MULTI CYCLONE DUST-COLLECTING APPARATUS

CROSS-REFERENCE TO RELATED APPLICATIONS

This application claims the benefit of Korean Patent Application No. 2004-97265 filed on Nov. 25, 2004, in the Korean Intellectual Property Office, the disclosure of which is incorporated herein by reference in its entirety.

FIELD OF THE INVENTION

The present invention relates to a cyclone dust-collecting apparatus. More particularly, the present invention relates to a multi-cyclone dust-collecting apparatus, which centrifugally separates contaminants from air and centrifugally re-separates remaining small contaminants.

BACKGROUND OF THE INVENTION

In general, a cyclone vacuum cleaner separates contaminants from dirt-laden air using centrifugal force. Recently, so-called multi-cyclone dust-collecting devices have been developed wherein two or more cyclones are arranged in series or parallel to improve dust separating/collecting efficiency.

An obvious problem with multi cyclone dust-collecting devices is that they have multiple cyclones. Many parts are required in a multi-cyclone vacuum cleaner compared to a single cyclone dust-collecting apparatus, in addition to the additional piping required to connect each cyclone and to provide a discharge path each cyclone, increasing the cost to manufacture a multi-cyclone vacuum cleaner.

SUMMARY OF THE INVENTION

The present invention solves the above-mentioned problems of multi-cyclone vacuum cleaners by providing a multi cyclone dust-collecting apparatus having a reduced or decreased number of elements. Another aspect of the present invention is to provide a multi cyclone dust-collecting apparatus having improved manufacturability.

In order to achieve the above aspects, there is provided a multi cyclone dust collecting apparatus or vacuum cleaner comprising: a multi cyclone unit having a first cyclone and a plurality of secondary cyclones; a top cover mounted on a top portion of the multi cyclone unit and having a plurality of connecting covers forming a connecting path for guiding air flowing out of the first cyclone to the secondary cyclone, and a discharge cover forming a discharge path for guiding air flowing out of the secondary cyclone to the outside, wherein the connecting covers and the discharge cover are integrally formed with the top cover; and a contaminant collecting unit mounted to a bottom portion of the multi cyclone unit and for collecting contaminants separated from the first cyclone and the secondary cyclones.

The discharge cover may comprise a first area gathering air discharged from the secondary cyclone, a plurality of secondary area branched from the first area and connected with the secondary cyclone in fluid-communication, and a third area which is a passage discharging air gathered from the first area.

The first area may be formed in a middle portion of the top cover, and the secondary area may be radially formed at the top cover to guide air discharged from the secondary cyclone to the secondary area.

The cyclone dust collecting apparatus may further comprise a gasket disposed between the top cover and the multi cyclone unit, and for sealing spaces among the multi cyclones and guiding air flowing in or out of the secondary cyclone.

The gasket may comprise a plurality of connecting slits radially arranged and a plurality of discharge pipes arranged in a direction of circumference.

The discharge cover of the top cover may cover at least a portion of the discharge pipe. An air discharge pipe may be formed at one side of the third area. The first cyclone and the secondary cyclone may be integrally formed.

BRIEF DESCRIPTION OF THE DRAWINGS

The above and other aspects, features and advantages of the present invention will be more apparent from the following detailed description taken with reference to the accompanying drawings, in which.

DETAILED DESCRIPTION OF THE PREFERRED EMBODIMENT

Figure 1:
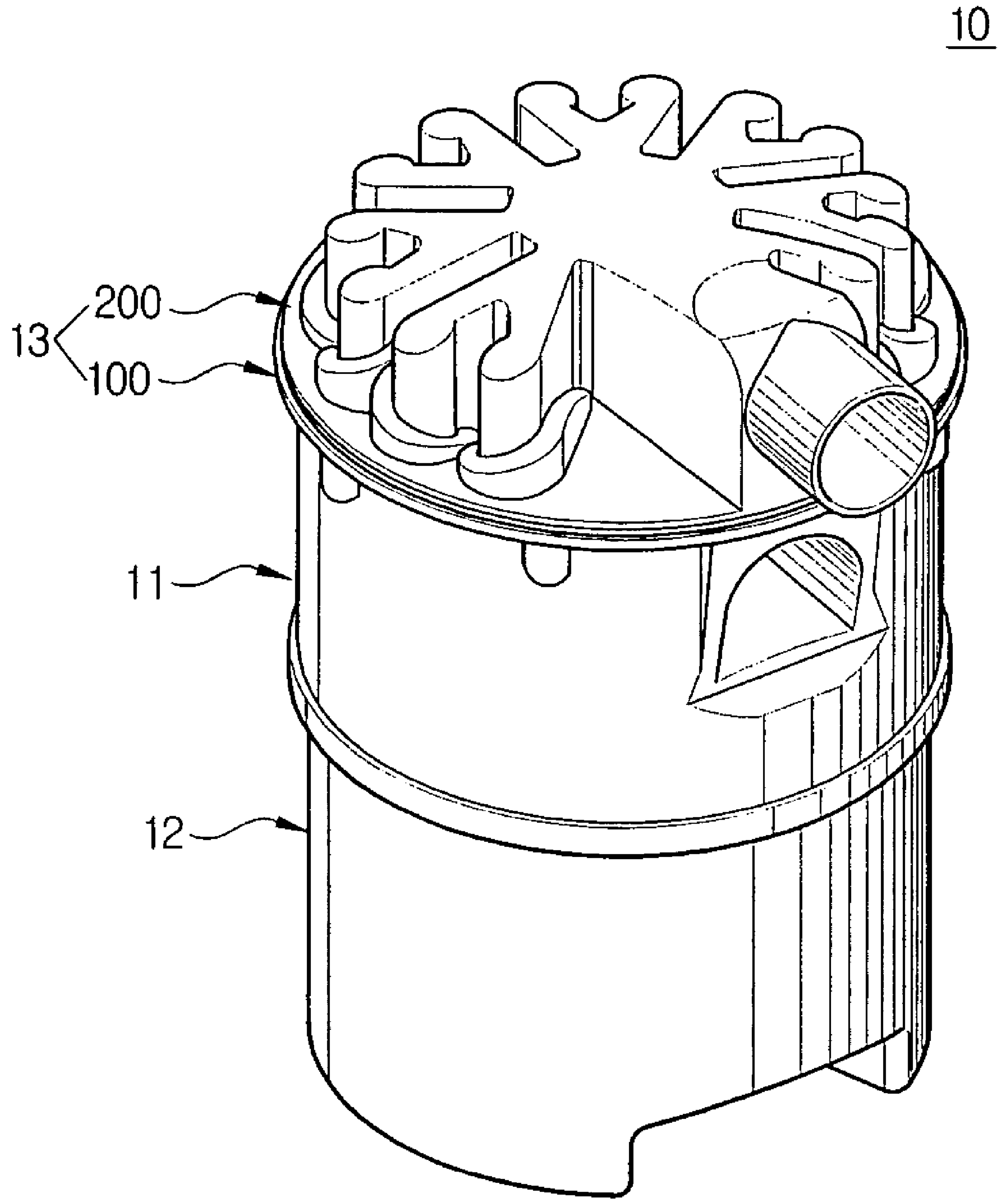
FIG. 1 is a perspective view of a multi cyclone dust collecting apparatus according to an embodiment of the present invention.

In the following description, same drawing reference numerals are used for the same elements even in different drawings. Well-known functions or constructions are not described in detail since they would tend to obscure the invention in unnecessary detail.

Referring to FIG. 1, a multi cyclone dust-collecting apparatus 10 comprises a multi cyclone chamber or unit 11, a contaminants collecting chamber unit 12 and a cover 13.

Figure 2:
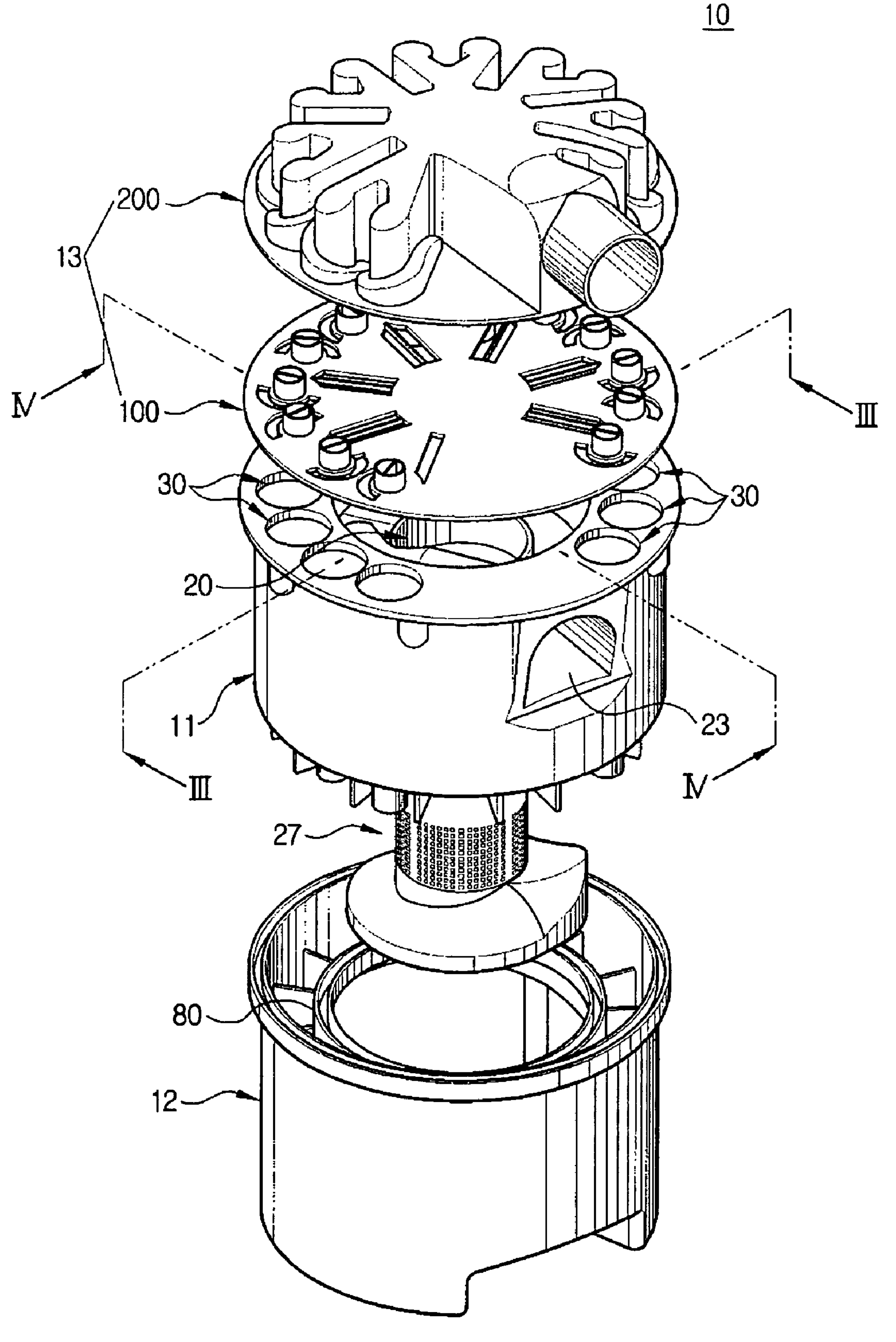
FIG. 2 is an exploded perspective view of FIG. 1.
Figure 3:
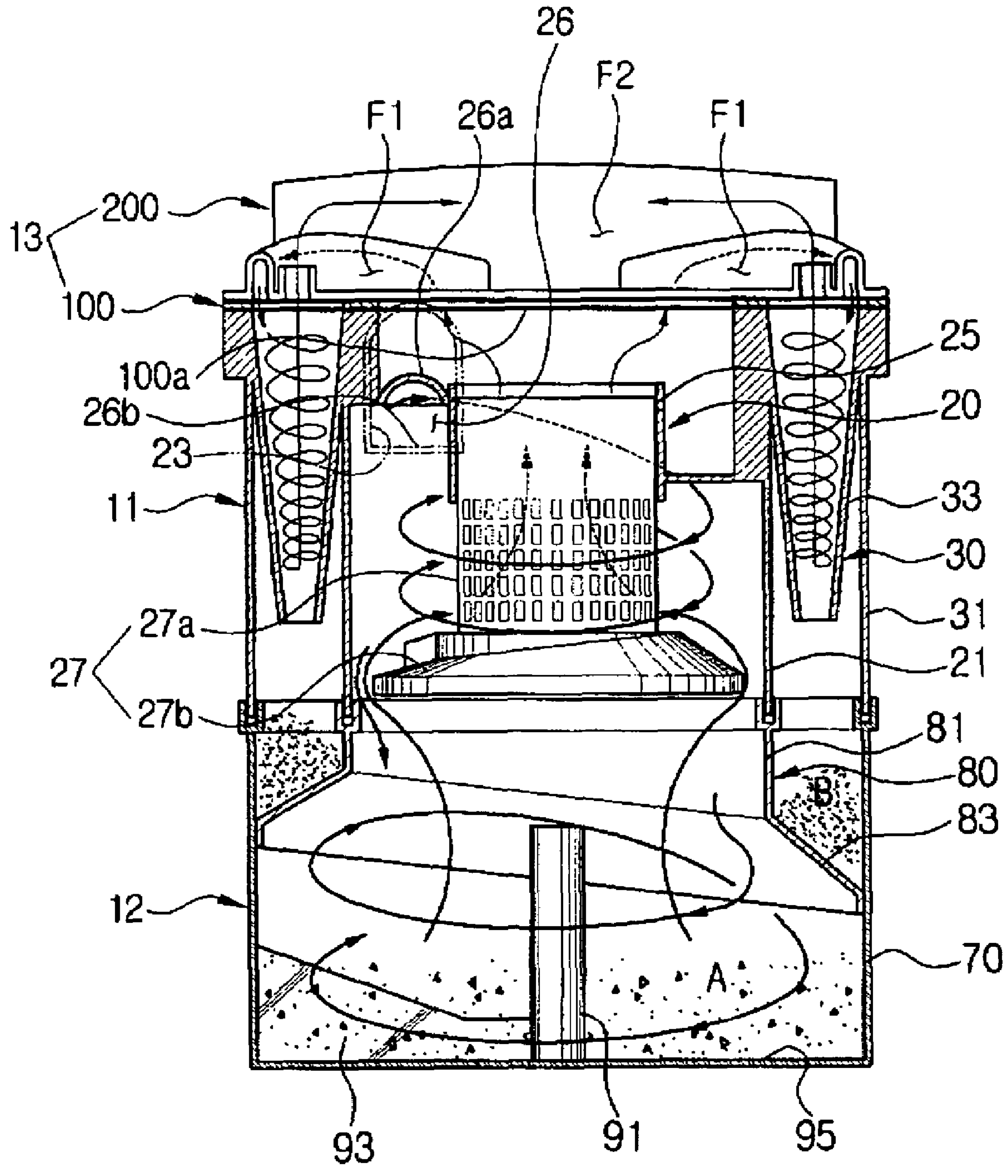
FIG. 3 is a sectional view of the multi cyclone unit taken on III-III line of FIG. 2.
Figure 4:
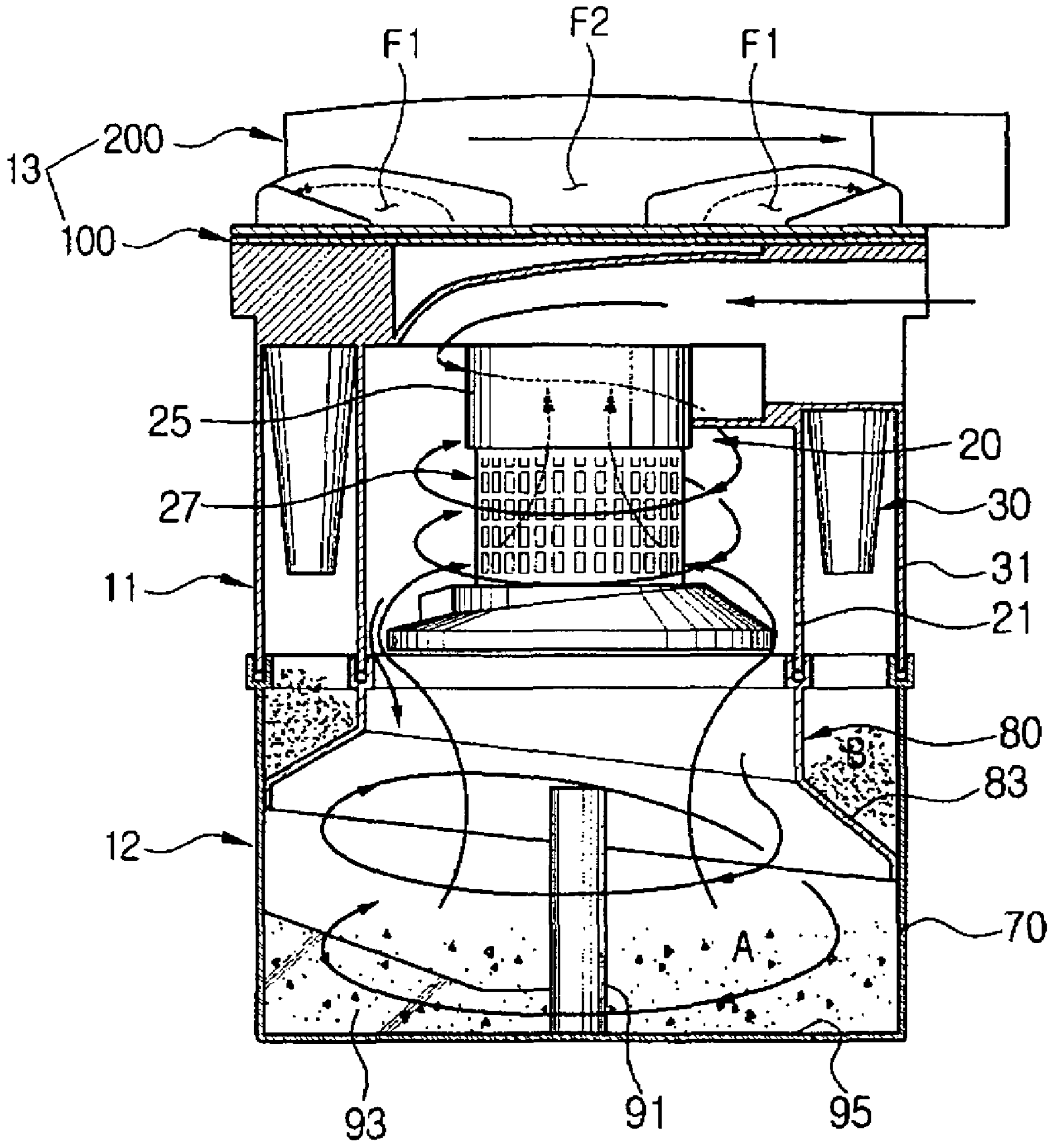
FIG. 4 is a sectional view of the multi cyclone unit taken on IV-IV line of FIG. 2.

Referring to FIGS. 2 to 4, the multi cyclone unit 11 comprises a first cyclone 20 that separates relatively large air-borne particles and multiple secondary cyclones 30 that receive air from the first cyclone 20 and which thereafter separate smaller air-borne particles.

As shown in FIG. 3 and FIG. 4, the first cyclone 20 comprises a cylindrical inner case 21. As shown in FIG. 1, the cyclone also has a suction port 23 for drawing air into the inner case 21 and a grill member 27 that separates or screens large particles and which is connected to an air outlet 25 of the inner case 21.

The inner case 21 is integrally formed with an outer case 31 which will be explained later. The bottom of the inner case 21 is opened, and top thereof is opened to connect with the air outlet 25. The air outlet 25 is configured to have smaller diameter than that of the inner case 21.

As shown in FIG. 3, an air guide wall 26 directs air to move downwardly and to generate a centrifugal force on air-borne particles. The air guide wall 26 comprises a domed top portion 26A and a flat bottom portion 26B. The domes top portion 26A is connected to the suction port 23.

The suction port 23 guides contaminants-laden air into the inner case 21. The suction port 23 is connected from the outside of the outer case 31 to the inner case 21 in fluid-communication. The suction port 23 guides air to gradually move downward.

The grill member 27 comprises a cylindrical body 27*a* having a plurality of small holes s and a skirt 27*b* engaged with a bottom portion of the body 27*a* so as to prevent relatively large centrifugally-separated contaminants in the inner case 21 from flowing backward and out via the air outlet 25. The top of the body 27*a* is connected with the air outlet 25.

The bottom portion of the body 27*a* is closed, and the skirt 27*b* extends along the outer circumference of the bottom portion. The skirt 27*b* has a smaller diameter than that of the inner case 21 and a larger diameter than that of the body 27*a* so as to prevent centrifugally-separated contaminants in the inner case 21 from flowing backward.

Each of the secondary cyclones 30 is comprised of the outer case 31 and a cone or funnel-shaped horn member 33. In the preferred embodiment, thirteen 13) secondary cyclones 30 are arranged at a certain interval in a direction of circumference at the outside of the first cyclone 20 except for the portion formed with the suction port 23. Those of ordinary skill will appreciate the other numbers of secondary cyclones 30 can be used with the invention disclosed and claimed herein, subject of course to appropriate reconfiguration of the other structures disclosed herein.

The top and bottom of the horn member 33 is opened so that air can form a whirlpool or cyclone with the horn member 33 and can descend and ascend to exit the horn member 33. The cyclonic motion of air within the horn member 33 exerts a centrifugal force on fine dusts in the horn member 33 by which such dusts are centrifugally separated to drop out of the horn member 33.

The first cyclone 20 is integrally formed with a plurality of the secondary cyclones 30 as shown in FIG. 2, typically by molding. As such, the number of parts required to provide several cyclones is reduced. As a result, manufacturing cost decreases and the assembability increases.

A contaminant collecting unit 12 is detachably mounted to the bottom portion of the multi cyclone unit 11. It comprises a main receptacle 70 and an isolation member 80. The main receptacle 70 has the same inside diameter as the outer case 31, and is preferably transparent so that the dirt level in the main receptacle 70 can be visually monitored without having to remove the main receptacle 70.

As shown in FIGS. 3 and 4, a pole 91 extends or protrudes from the bottom 95 of the main receptacle 70. The pole 91 helps prevent contaminants in the first space part A from ascending out of the main receptacle 70 by way of a whirling air current in the first space part A.

A partition wall 93 is provided on the bottom 95 of the main receptacle 70, which connects the pole 91 and the inner wall of the main receptacle 70. The partition wall 93 inhibits contaminants collected in the main receptacle 70 from rotating or flowing by air current.

Referring to FIG. 3, an isolation member 80 comprises a cylindrical body 81 engaged with the inner case 21 and a skirt part 83 extended from a lower end of the body 81 and engaged with the inside of the main receptacle 70. The skirt part 83 of the isolation member 80 is preferably inclined to one side. As such, when fine dusts are collected in the inclined portion of the skirt part 83, the collected contaminants amount can be easily checked from the outside. In the first space part A, formed by the inside of the isolation member 80 and the lower portion of the main receptacle 70, relatively large contaminants separated from the first cyclone 20 are collected.

The secondary space part B, formed by the outside of the isolation member 80 and the upper portion of the main receptacle 70, is connected with the secondary cyclones 30, and relatively small contaminants, centrifugally-separated from the secondary cyclone 30, are collected in the secondary space part B.

The cover unit 13 is mounted on the top portion of the multi cyclone unit 11. A connecting path F1 guides air flowing out of the first cyclone 20 into the secondary cyclones 30 and is integrally formed with a discharge path F2 for discharging air flowing out of the secondary cyclones 30 to the outside. The cover unit 13 comprises a gasket 100 and a top cover 200.

As described above, the cover unit 13 has both of the connecting path F1 and the discharge path F2, which are integrally formed together, therefore, the number of elements and manufacturing cost remarkably decreases compared to a conventional multi cyclone dust collecting apparatus which requires lots of elements for the connecting path F1 and the discharging path F2. Additionally, the assembability considerably increases compared to a conventional multi cyclone dust-collecting apparatus which has to be one by one assemble the connecting path F1 and the discharging path F2 with the plurality of cyclones.

Figure 5:
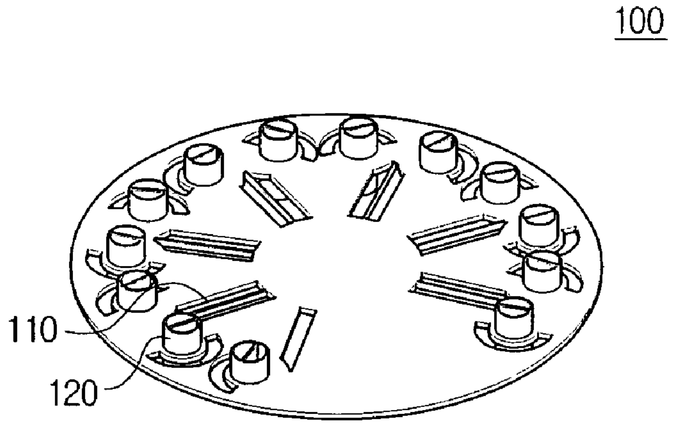
FIG. 5 is an enlarged perspective view of a gasket of FIG. 2.

Referring to FIGS. 2 and 5, the gasket 100 is disposed between the top cover 200 and the multi cyclone unit 11 to seal a space therebetween, and guides air flowing into or out of the secondary cyclone 30.

The gasket 100 comprises a plurality of connecting slits 110 radially disposed about the gasket's center and, a plurality of discharge pipes 120 which are also arranged about the gasket's center.

A linear connecting slit 110 fluidically couples the first cyclone 20 and the secondary cyclones 30. The connecting slit 110 is hook-shaped and encloses the discharge pipe 120. Air flowing out of the first cyclone 20 is guided in a centrifugal direction in the secondary cyclone 30 due to the hooky connecting slit 110 such that fine contaminants can be more efficiently separated in the secondary cyclone 30.

A plurality of discharge pipes 120 are arranged in a circumference direction of the gasket 100. Air that has been centrifugally filtered ascends and flows out of the discharge pipes 120. When the gasket 100 covers the secondary cyclones 30, a part of the discharge pipe 120 protrudes downwardly from the gasket 100 into the horn member 33 of the secondary cyclone 30, and protrudes upwardly from the gasket 100 to insert in the top cover 200. The discharge pipe 120 may be separately or integrally formed from or with the gasket 100.

Figure 6:
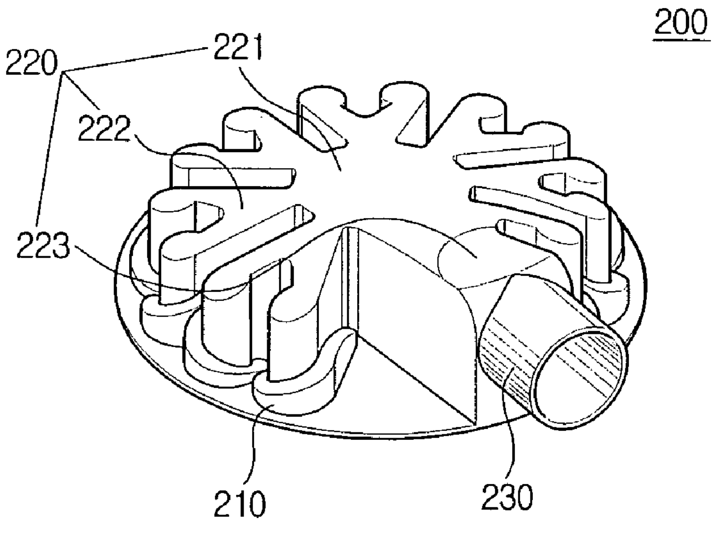
FIG. 6 is an enlarged perspective view of an upper cover of FIG. 2.

Referring to FIGS. 2 and 6, a connecting cover air path 210 and a discharge cover 220 are integrally formed by molding the top cover 200. As such, the connecting cover air path 210 and the discharge cover 220 can be manufactured at one time, further decreasing the number of elements and reducing manufacturing cost. The top cover having the connecting cover air path 210 and the discharge cover 220 covers the gasket 100, and the connecting path F1 and the discharge path F2 are integrally formed to aid manufacturability.

A plurality of the connecting cover air paths 210 are radially arranged which take on configuration of hooks as the connecting slit 110. When the connecting cover air paths 210 cover the connecting slit 110, the connecting path F1 is sealingly defined which guides air flowing via the first cyclone 20 to the secondary cyclone 30. In specific, the connecting path F1 guides air discharging to the air outlet 25 of the first cyclone 20 in a direction of center to enter the secondary cyclone 30.

The discharge cover 220 and the gasket 100 form the discharge path F2 to discharge air, to the outside, flowing out of the discharge pipe 120. For this purpose, the discharge cover 220 encloses at least one part of the discharge pipe 120. The discharge pipe 220 comprises a first area 221 that flows together or merges, air discharged from the secondary cyclones 30, a plurality of secondary areas 222 branched from the first area 221 and connecting with the secondary cyclone 30 in fluid-communication, and a third area 223 which is a passage for discharging air joined from the first area 221.

The first area 221 is a cylindrical area formed in a center portion of the top cover 200, and has a space gathering air discharged from the discharge pipe 120 when the top cover 200 covers the gasket 100.

The second area 222 is radially branched from the first area 221, and has a plurality of passages guiding air discharged from the discharge pipe 120 to the first area 221 when the top cover 200 covers the gasket 100. The second area 222 takes on a Y configuration to cover each of twelve (12) of the thirteen (13) discharge pipes 120 by two, and otherwise a line to cover the remaining one of discharge pipe 120. The connecting cover 210 covers around the secondary area 222 to utilize the maximum area of the top cover 200.

The third area 223 is linearly branched from the first area 221, and forms a passage to discharge air gathered in the first area 221 at once when the top cover 200 covers the gasket 100. An air discharge pipe 230 is formed at one side of the third area 223. The cylindrical air discharge pipe 230 is a passage to finally discharge air and is formed integrally with or separately from the third area 223. A driving source for generating a suction force may be directly or indirectly mounted to the discharge pipe 230.

Referring to FIGS. 3 and 4, contaminants-laden air flows via the suction port 23 into the cyclone dust collecting apparatus 10. The air guide wall 26 guides the air to form a rotation stream, and the air then flows in the inner case 21.

Relatively large-sized contaminants fall and are collected into the first space part A of the main receptacle by a centrifugal force created by air stream rotation. Once-cleaned air passes the grill member 27 and flows out through the air outlet 25 and into secondary cyclones for additional centrifugal filtration.

The air ascending via the air outlet 25 hits a bottom surface 100*a* of the gasket 100 and diffuses. As a result, it flows along the connecting path F1 formed by the connecting slit 110 and the connecting cover 210 into the secondary cyclones 30. The secondary cyclones 30 centrifugally separate relatively small-sized contaminants which have not been separated from the first cyclone 20. The small-sized contaminants separated by the secondary cyclones 30 fall into and are accumulated in the secondary space area B.

The air that is separated from small-sized contaminants passes the discharge pipe 120 of the gasket 100 and is then discharged along the discharge path F2 formed by the gasket 100 and the top cover 200 to the outside.

In a multi cyclone dust-collecting apparatus is applied according to the present invention as described above, the first cyclone 20 and the secondary cyclone 30 are integrally formed such that the number of elements for the multi cyclone dust-collecting apparatus can be reduced, the cost can decrease and assembability can increase.

The foregoing embodiment is an example and should not be construed to limit the scope of the appended claims, which define the metes and bounds of the claimed invention. Those or ordinary skill in the art will appreciate that the present teaching can be readily applied to other types of particle separators and is not limited to vacuum cleaner uses.

What is claimed is:

1. A multi cyclone dust collecting apparatus comprising:

a multi cyclone unit having a first cyclone and a plurality of secondary cyclones;

a top cover mounted on a top portion of the multi cyclone unit and having a plurality of connecting covers forming a connecting path for guiding air flowing out of the first cyclone to the secondary cyclones, and a discharge cover forming a discharge path for guiding air flowing out of the secondary cyclone to the outside, wherein the connecting covers and the discharge cover are integrally formed with the top cover; and a contaminant collecting unit mounted to a bottom portion of the multi cyclone unit and for collecting contaminants separated from the first cyclone and the secondary cyclones.

2. The multi cyclone dust collecting apparatus according to claim 1, wherein the discharge cover comprises a first area gathering air discharged from the secondary cyclone, a plurality of secondary areas branched from the first area and connected with the secondary cyclone in fluid-communication, and a third area which forms a passage for discharging air gathered from the first area.

3. The multi cyclone dust collecting apparatus according to claim 2, wherein the first area is formed in a middle portion of the top cover, and the secondary area is radially formed at the top cover to guide air discharged from the secondary cyclone to the secondary area.

4. The cyclone dust collecting apparatus according to claim 2, further comprising:

a gasket disposed between the top cover and the multi cyclone unit, and for sealing spaces among the multi cyclones and guiding air flowing in or out of the secondary cyclones.

5. The multi cyclone dust collecting apparatus according to claim 4, wherein the gasket comprises a plurality of connecting slits radially arranged and a plurality of discharge pipes arranged in a direction of circumference.

6. The multi cyclone dust collecting apparatus according to claim 5, wherein the discharge cover of the top cover covers at least a portion of the discharge pipe.

7. The multi cyclone dust collecting apparatus according to claim 2, wherein an air discharge pipe is formed at one side of the third area.

8. The multi cyclone dust collecting apparatus according to claim 1, wherein the first cyclone and the secondary cyclones are integrally formed.

* * * * *